United States Patent [19]
Sharrow

[11] 3,848,889
[45] Nov. 19, 1974

[54] LOAD FASTENERS
[76] Inventor: Clarence C. Sharrow, 121 11th Ave., South St. Paul, Minn. 55112
[22] Filed: Sept. 17, 1973
[21] Appl. No.: 397,643

Related U.S. Application Data
[63] Continuation-in-part of Ser. No. 260,248, June 6, 1972, abandoned, which is a continuation-in-part of Ser. No. 120,546, March 3, 1971, abandoned.

[52] U.S. Cl............................................. 280/179 A
[51] Int. Cl.............................................. B60p 7/00
[58] Field of Search............ 280/179 A; 105/369 A; 248/361 A

[56] References Cited
UNITED STATES PATENTS

| | | | |
|---|---|---|---|
| 2,738,204 | 3/1956 | Ibey | 280/179 A |
| 3,409,263 | 11/1968 | Jantzen | 248/361 A |
| 3,412,692 | 11/1968 | Evans | 105/369 A |
| 3,428,331 | 2/1969 | Morgan | 280/179 A |

Primary Examiner—Robert R. Song
Attorney, Agent, or Firm—Jacobson and Johnson

[57] ABSTRACT

A heavy duty load fastener designed to tightly hold bulky materials on a flatbed carrier. The holding device of one embodiment includes a high tensile strength nylon strap having a hook on one end for engaging the edge of a flatbed carrier and a smooth end on the other end for insertion into a ratchet winding mechanism. The winding mechanism is hand operable for securely tightening the nylon strap against the load on the device when in the holding position. The tension on the nylon strap coacts with the ratcheting mechanism to produce a tamperproof lock that cannot be inadvertently released. In another embodiment a high tensile strength nylon strap passes around web supporting surfaces on the load fastener to enable the fastener to securely hold a load together when the load fastener is mounted on the flatbed carrier or to the load.

8 Claims, 13 Drawing Figures

INVENTOR
CLARENCE C. SHARROW
BY Stryker & Jacobson
ATTORNEYS

INVENTOR
CLARENCE C. SHARROW

BY  Stryker & Jacobson

ATTORNEYS

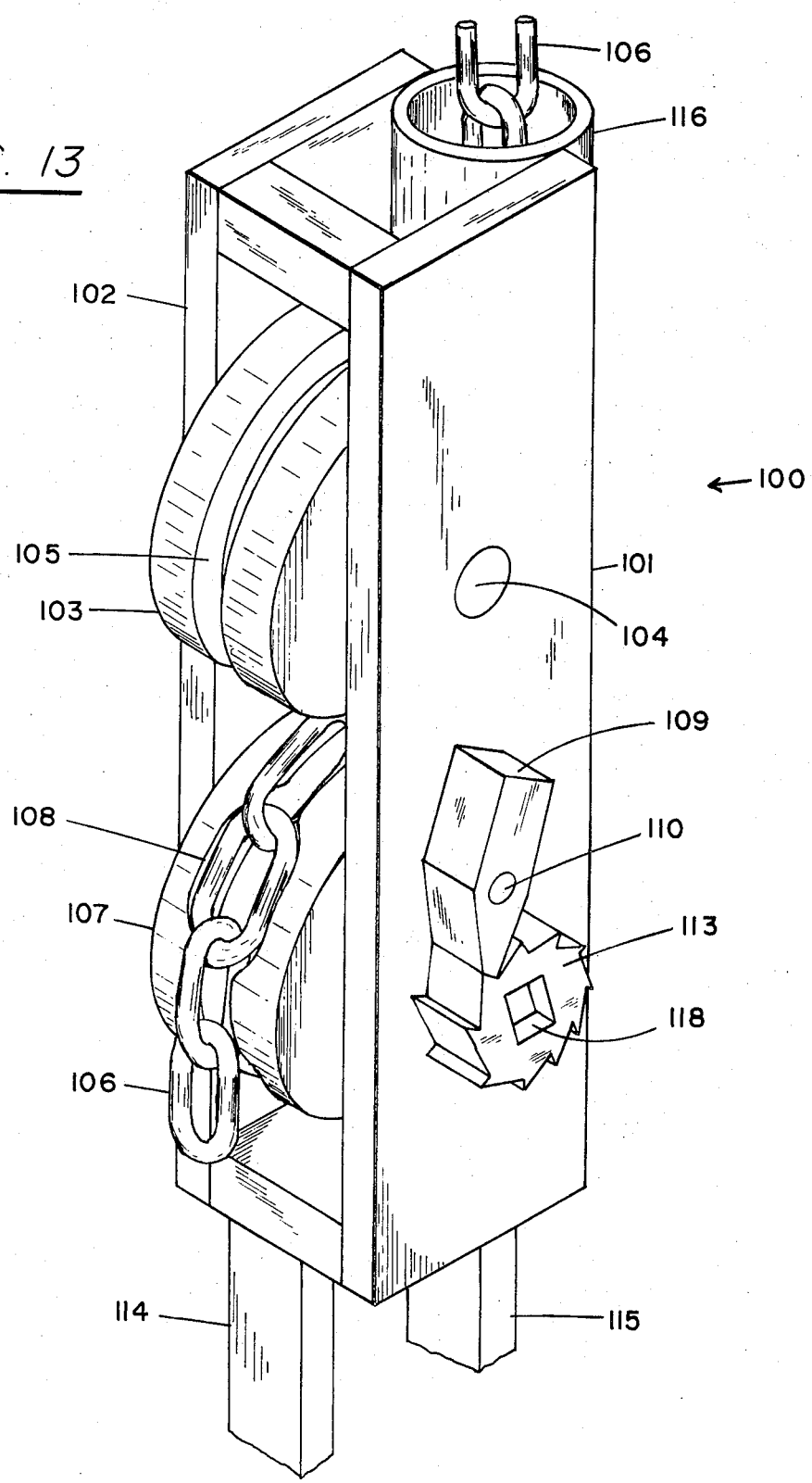

LOAD FASTENERS

CROSS REFERENCE TO RELATED APPLICATIONS

This application is a continuation-in-part of my application on "Load Fasteners" filed June 6, 1972, Ser. No. 260,248, now abandoned, which is a continuation-in-part of my patent application on "Load Fasteners, filed Mar. 3, 1971, Ser. No. 120,546, now abandoned.

BACKGROUND OF THE INVENTION

Field of the Invention

In the prior art, numerous devices have been used to hold large loads on flatbed trucks and other similar carrier vehicles. Typically, the items transported on flatbeds are pipes, utility poles, tubing, plywood, lumber, and the like. The prior art fastening devices or tiedowns for holding the material on the flatbed generally comprise a chain and a chain binder which uses a lever and pivot action to securely tighten the chain around the load in order to prevent any shifting of the load by sudden stopping or movement of the flatbed. However, there is a disadvantage in using metal fasteners such as chains because they generally gouge into the soft surfaces of articles such as utility poles, coated pipes, etc. In order to prevent damage to the load, some type of blocking must be used to prevent the chain from contacting the material that is being transported.

Other prior art fastening devices use flat metal bands which are fastened to the flatbed carrier to tightly hold the materials to the flatbed. However, these types of fastening devices are generally expensive to use because they are not reusable.

Other prior art web fastening devices are useful only as a hold down and are of insufficient strength to be used to hold heavy loads on flatbed carriers during transit.

The present invention overcomes the problems due to gouging and non-reusability of prior art fastening devices by providing a strong yet pliable tiedown comprising a webbing that can be tightly forced against soft surfaces which would be gouged by a metal fastener or the like. For example, the coated natural gasline pipes or wooden utility poles could easily be gouged by a chain located thereon. In addition, the design of my invention precludes accidental loosening of the fastening device as well as being adaptable to a wide variety of load sizes.

Another disadvantage of prior art load fastening devices is that they either are mounted permanently to the carrier or they must be fastened to the carrier bed when they are used. The disadvantage of permanently mounted load fasteners is that lift loader operators often hit them and damage them during loading.

SUMMARY OF THE INVENTION

Briefly, the present invention comprises a load fastener having a high tensile strength elastic strap for fastening a load to a flatbed or binding the load together as an integral unit. In one embodiment, the fastener has a hook on one end of the strap for engaging the edge of a flatbed and a smooth end on the opposite end for insertion into the ratchet winding mechanism operated by a detachable handle. In still another embodiment of the invention, a flat elastic strap is threaded through the load fastener or ratchet winding mechanism and around the load to snugly bind the load together.

In still another embodiment of the invention, the load fastener is removably mounted on the flatbed of a truck and maintains its hold on the flatbed of the truck through exertion of torsional forces on the housing of the load fastener.

Still another feature of the present invention is that the detachable handle can be inserted onto the handle winding wheel so that the operator can place a high torque on the ratchet winding mechanism to thereby pull the strap tightly against the load and the flatbed. The tension produced on the strap is such that it exerts a clockwise torque and a ratchet wheel to place the ratchet in the pawl in interlocking engagement thus preventing the strap from being inadvertently released during transit. To release the device, the operator must actually tighten the straps further to disengage the pawl.

BRIEF DESCRIPTION OF THE DRAWINGS

FIG. 13 is a perspective view of an embodiment of my invention which utilizes a chain instead of a web.

DESCRIPTION OF THE PREFERRED EMBODIMENT

Figure 1:
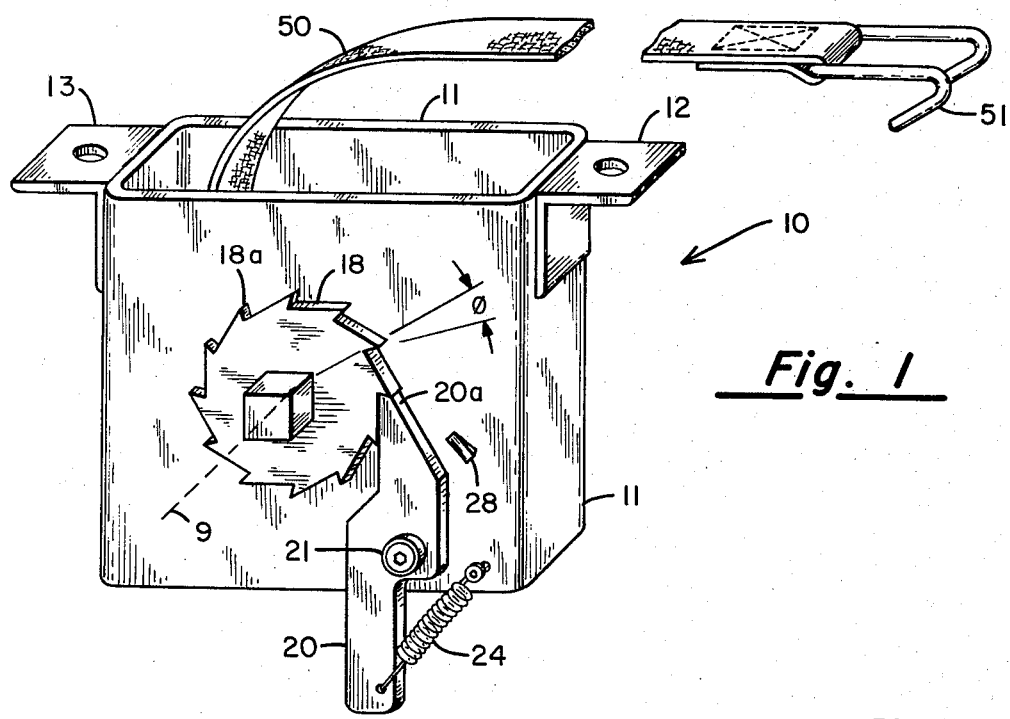
FIG. 1 is a perspective view of my invention showing the tightening and holding mechanism and the pliable strap for securing the load.

Referring to the drawing, FIG. 1 shows a perspective view of one embodiment of my fastening and tightening mechanism 10. Mechanism 10 comprises an open ended housing 11 having brackets 12 and 13 on opposite ends for fastening to the underside of a flatbed or the like. Preferably, the housing is located immediately under the stake openings of the flatbed carrier.

Figure 2:
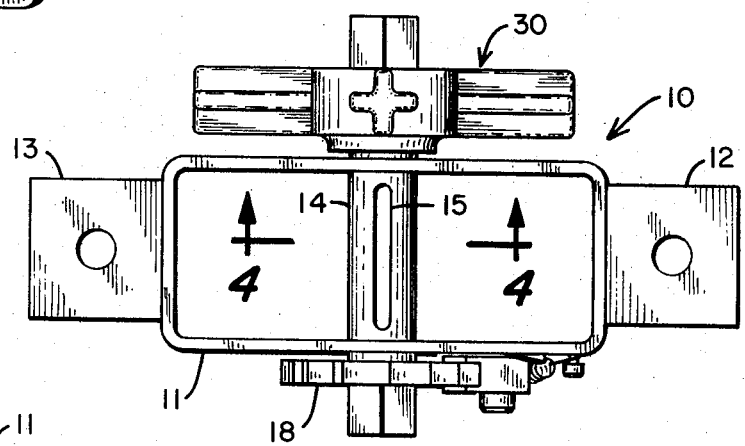
FIG. 2 is a top view of my tightening and fastening mechanism.
Figure 4:
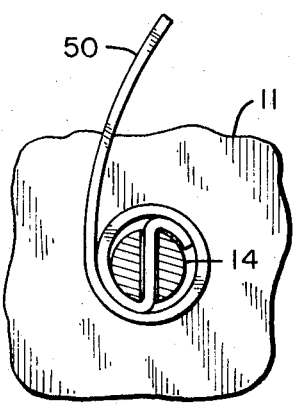
FIG. 4 is a cross-sectional view taken along lines 4—4 of FIG. 2.
Figure 3:
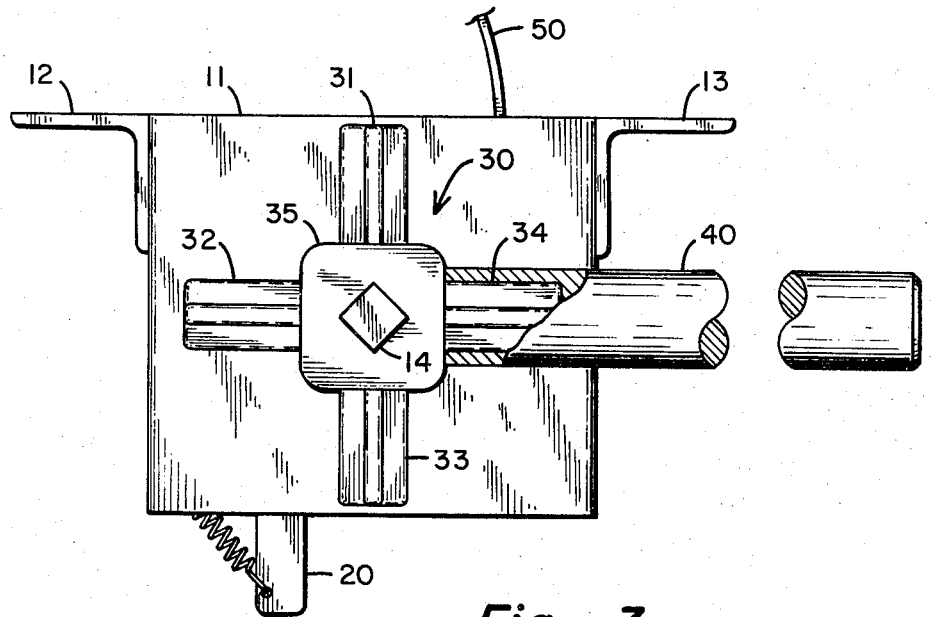
FIG. 3 is a rear view of my tightening and fastening mechanism and the detachable handle for tightening the strap.

Referring to FIG. 1, FIG. 2 and FIG. 3, my invention will now be described.

Located centrally through housing 11 is a rotatable shaft 14 having an elongated opening 15 therein for engaging a pliable high tensile strap or web 50. The central portion of shaft 14 is circular so that it can rotate in circular openings in housing 11 as well as smoothly wind a strap there-around. Located on one end of shaft 14 is keyed section and ratchet wheel 18 having a mating opening and a set of teeth 18a. Each of the teeth forms an acute angle $\phi$ with respect to a radial line emanating from the central axis 9 of ratchet wheel 18. Located adjacent ratchet wheel 18 is a pawl 20 that is pivotally mounted to housing 11 by a shoulder bolt 21.

One end of a tension spring 24 fastens to pawl 20 and the other end of the tension spring 24 fastens to housing 11. Tension spring 24 thus holds pawl 20a in contact with the underside of teeth 18a of ratchet wheel 18. Pawl tip 20a has an angled edge which is the complement of angle $\phi$ so as to form mating interlocking engagement with teeth 18a. Thus, in order to pivot pawl 20 clockwise it is necessary to first rotate ratchet wheel 18 counterclockwise. If there is a clockwise torque on ratchet wheel 18, it is apparent that ratchet wheel 18 and pawl 20 coact to form interlocking engagement to thereby prevent accidental disengagement of pawl 20.

Located immediately to the right of pawl 20 and housing 11 is a wedge-shaped stop 28 to use for temporarily holding pawl 20 in a spaced position from ratchet 18. In operation of pawl 20, an operator rotates pawl 20 clockwise until it rides up and over stop 28. Stop 28 thus prevents the return of pawl 20 to a position against the ratch wheel, the operator presses inward on the bottom of pawl 20 so pawl tip 20a can ride up and over stop 28 and thus back into contact with ratchet wheel 18.

Located on the opposite side of housing 11 and on shaft 14 is a hand wheel or turning member 30 that includes four shafts 31, 32, 33 and 34 that project radially outward from hub 35. Shafts 31, 32, 33 and 34 have a cross-sectional area in the form of a cross that forms mating engagement with detachable handle 40. Turning member 30 has a keyed opening that forms non-rotatable engagement with the end of shaft 14.

Figure 5:
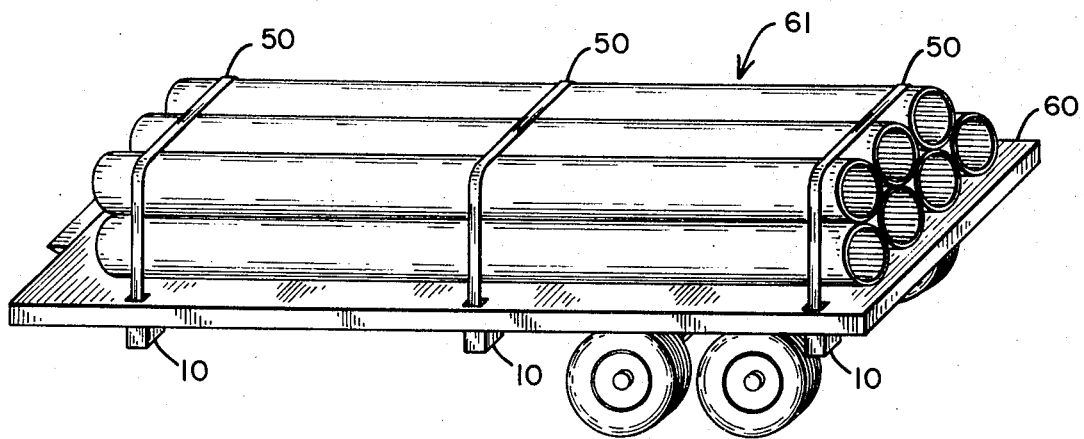
FIG. 5 shows three of my units in operation on a flatbed trailer truck.

In the operation of the invention, the operator fastens hook 51 to one side of a flatbed carrier 60. He then places web 50 over the load and into housing mechanism 10. Next, he inserts the free end of web 50 into the opening 15 in shaft 14. The operator then rotates shaft 14 counterclockwise (as viewed in FIG. 1) by turning hand wheel 30. Initially, the operator rotates hand wheel 30 by hand to snug strap 50 against shaft 14 and against a load 61 (FIG. 5). After the straps have been snugged up, the operator places the detachable mountable handle 40 onto one of the mating shafts projecting from hand wheel 30 (FIG. 3). He then applies a counterclockwise torque to shaft 14 to thereby tighten strap 50 against the load. As he does so, ratchet wheel 18 rotates counterclockwise and pawl 20 slides freely over the top of teeth 18a. When the operator releases the force on handle 40, the ratchet wheel rotates clockwise until it engages pawl tip 20a. Thus, the ratchet wheel is locked in the position against pawl 20a. The operator continues to rotate shaft 14 until he has sufficient tension on the web to securely hold the load on the flatbed. Preferably, the operator uses a nylon strap with a tensile strength of approximately 12,000 pounds. Furthermore, because the nylon strap has a certain amount of elasticity, the tension can be gradually applied with a relatively large ratchet type mechanism such as shown in the present invention. Once the operator has the members securely tightened, he removes detachable handle 40 and stores it in his cab until he arrives at the destination for unloading the items. When he wishes to unload the items, he applies torque in a counterclockwise direction to rotate shaft 14 counterclockwise (as viewed from FIG. 1). This frees pawl 20 so it clears the tips of teeth 18. Then the operator pushes pawl tip 20a out of the way of ratchet wheel 18. The operator then allows ratchet wheel 18 to turn approximately one-half turn clockwise. He then engages pawl 20 with ratchet wheel 18 and repeats the process using a different shaft on hand wheel 30. In approximately two to three operations of this nature, the tension is removed from strap 50. The operator can then move pawl tip 20a behind stop 20 and quickly unwind strap 50 from shaft 14. Once the strap is unwound the operator removes the strap and stores it in his cab until he is ready to use it again.

It will be apparent with this type of invention, that the unit is readily adaptable to accommodate different sized straps and even extension of straps by fastening additional members onto the end of hook 51. Furthermore, this embodiment of the present invention envisions an open bottom housing 11 so that an operator can easily thread web 50 into the opening in shaft 14. Also, the open housing prevents any dirt, etc., from accumulating in the bottom of housing 11. This ensures that the unit is always clean and in good operating condition.

Figure 6:
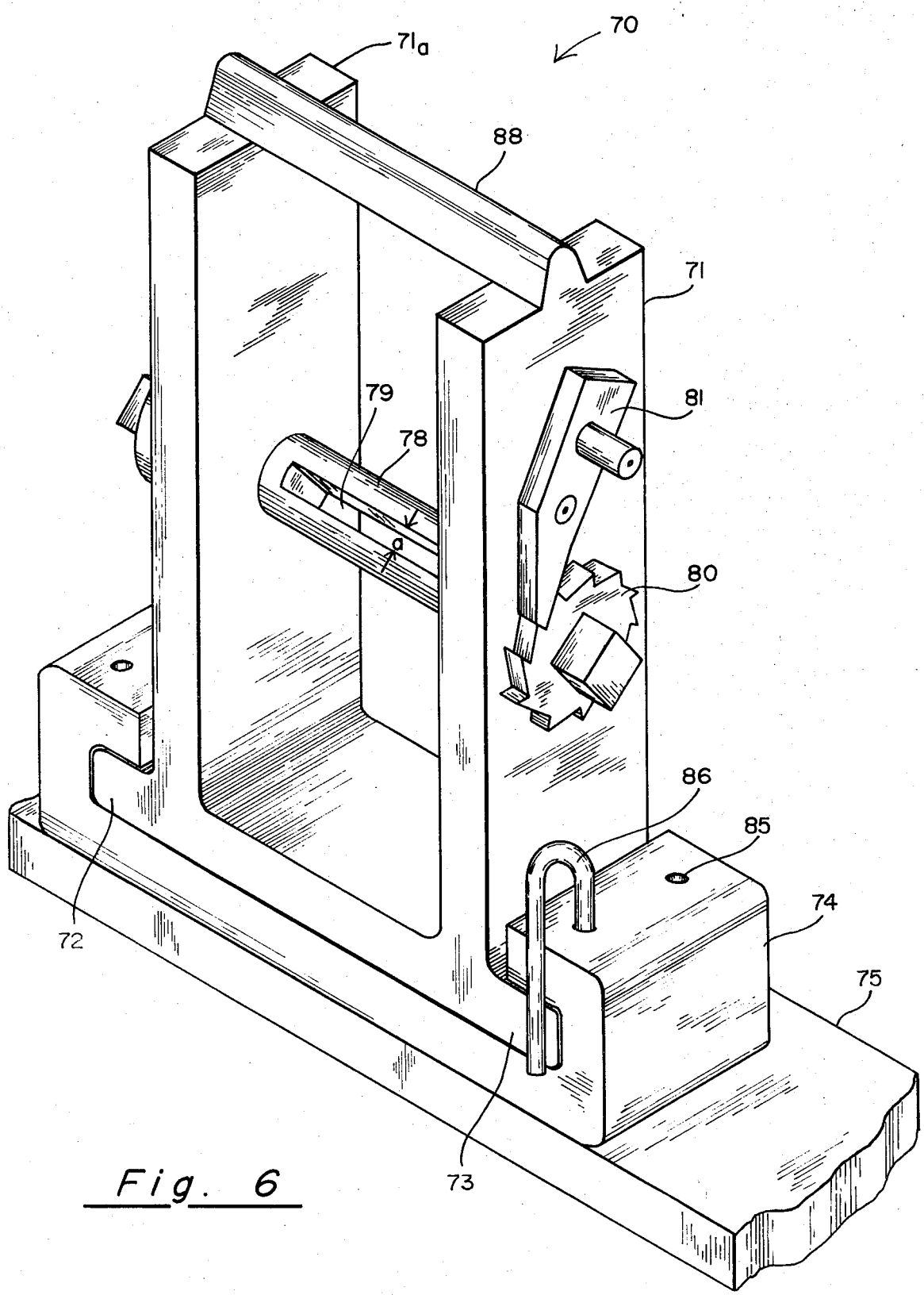
FIG. 6 is a perspective view of another embodiment of my load fastening device showing the winding mechanism and the removably mounted housing.

Referring to FIG. 6, there is shown a perspective view of an alternate embodiment of a removably mounted load fastener 70. Load fastener 70 comprises housing members 71 and 71a having a base with ears or protrusions 72 and 73 thereon which form slidable mating engagement with a C-shaped housing 74. C-shaped housing 74 is typically mounted over the stake opening on the flatbed carriers. In the event that load fastener 70 is not to be used as a removably mounted load fastener, housing 71 could be directly fastened to the flatbed carrier itself. However, it is generally preferred to have the fastener removably mounted so that the unit can be easily removed during the loading of the carrier. That is one of the problems with prior art load fastening devices that are permanently mounted to the carrier is that loading of the carrier is more difficult because the load fastener is in the way. Also, the fastener is oftentimes damaged because the loader failed to see the fastener protruding from the carrier.

Located centrally through housing 71 and housing 71a is a rotatable shaft 78 having an elongated opening 79 therein of predetermined width "a." The opening 79 in shaft 78 is sufficiently wide so as to accommodate two widths of webbing or strap material to be used in the winding mechanism. Typically, an opening of three-eighth inch is used with a shaft having a diameter of 1½ inches. With these dimensions a 3 inch wide nylon strap capable of withstanding 24,000 pounds can be used either singly or doubly in load fastener 70. The purpose of the width "a" to accommodate two straps will become apparent when the operation of the unit is further described.

Load fastener 70 contains a ratchet wheel 80 and a pawl 81 which is similar to that shown in FIG. 1. There is a slight difference between the pawl shown in FIG. 1 and in the embodiment shown in FIG. 6 in that the pawl of FIG. 6 is not spring mounted to return it to interlocking position with ratchet wheel 80. However, the angle of the teeth of the ratchet wheel are identical as they form locking engagement with pawl 81 thus requiring an actual tightening up of the web or strap before the load fastener can be released from the load.

In order to provide for hauling of partial loads, I provide a means for temporarily securing the fastener 70 to the C-shaped member 74, that is, holes 85 match with holes in ears 72 and 73 (not shown), thus allowing one to insert a pin 86 therein. Thus, if one wishes to, he can attach load fastener 70 to the C-shaped housing 74 by inserting pins through the openings 85. However, for most operations, this is not necessary.

One of the improved features of load fastener 70 is a top cross bar or web supporting surface 88 that extends from housing member 71 to housing member 71a. This cross bar not only provides strength to the unit but produces torque on the housing to hold it in member 74. This aspect will become evident in the description of the operation of the invention with a loaded carrier.

Figure 7:
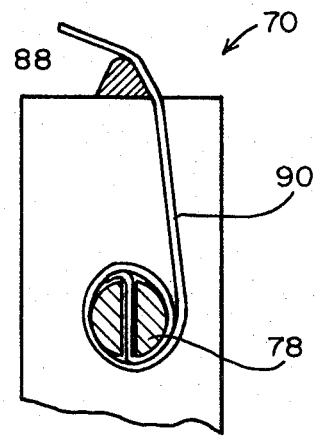
FIG. 7 is a cross-sectional view showing the operational aspects of the web supporting surface of FIG. 6.
Figure 8:
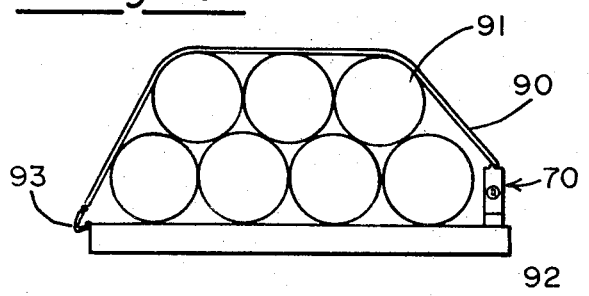
FIG. 8 shows the load fastener of FIG. 6 and FIG. 7 holding a load on a flatbed carrier.

Referring to FIG. 7, a partial view of load fastener 70 shows a web 90 wound around shaft 78 and passing over web supporting surface 88. Reference should also be made to FIG. 8 which shows a cross-sectional view of a flatbed carrier 90 having a load of pipes or poles 91 thereon which are fastened to a carrier by a strap 90 having a hook 93 on one end similar to hook 51. In this particular operation, strap 90 passes over the top bar or web supporting surface 88 and produces a torque on housing members 71 and 71a. This torque produces a counter torque between ears 72 and 73 of housing members 71 and 71a and C-shaped holding member 74. This torque combined with the frictional force between member 74 and fastener 70 prevents the load fastener from slipping out of the C-shaped housing 74. Further prevention of the load fastener from slipping in the C-shaped housing is provided by the fact that the load 91 prevents inward movement of housing 71 and the tension on strap 90 also prevents outward movement of housing 71. Thus, the load fastener is tightly and securely held to the carrier even through the load fastener can be easily removed once the tension is removed from strap 90. Also, I utilize a housing of greater strength than the web 90 to insure that if the load is fastened too tight, the web will break rather than the housing. This feature is an important safety consideration as the elasticity in the strap could hurl the load fastener like a missile if it should break. Typically, my housing will withstand a 30,000 pound force while my web will withstand 12,000 to 24,000 pounds of force.

Figure 9:
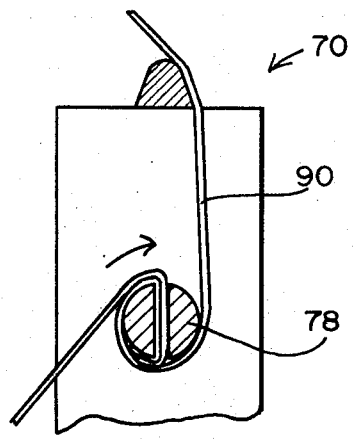
FIG. 9 shows a cross-sectional view of the load fastener of FIG. 6 with a double strap inserted therein for fastening around an entire load.

Referring to FIG. 9, there is shown an alternate strap configuration of how load fastener 70 can be utilized to hold a load onto a flatbed carrier without securing the strap to the opposite side of the carrier. This may be suitable for fastening a portion of the load. For example, in the case where part of the load is to be delivered to one area and the other portion is to be delivered elsewhere. In this particular embodiment, elastic strap 90 passes around load 91 with both ends of the strap passing through opening 79 in shaft 78. In this particular strap configuration, it becomes apparent why the opening 79 in shaft 78 is twice the width of the strap. By having the opening twice the width of the strap, both ends of strap 90 can be inserted through opening 79. Then by clockwise rotation of the shaft 78, one can tighten strap 90 by turning of the ratchet mechanism.

In this hookup it obviously would be preferable to pin load fastener 70 to member 74.

Figure 10:
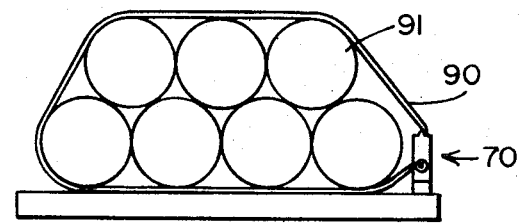
FIG. 10 illustrates the double strap of FIG. 9 passing around an entire load.
Figure 11:
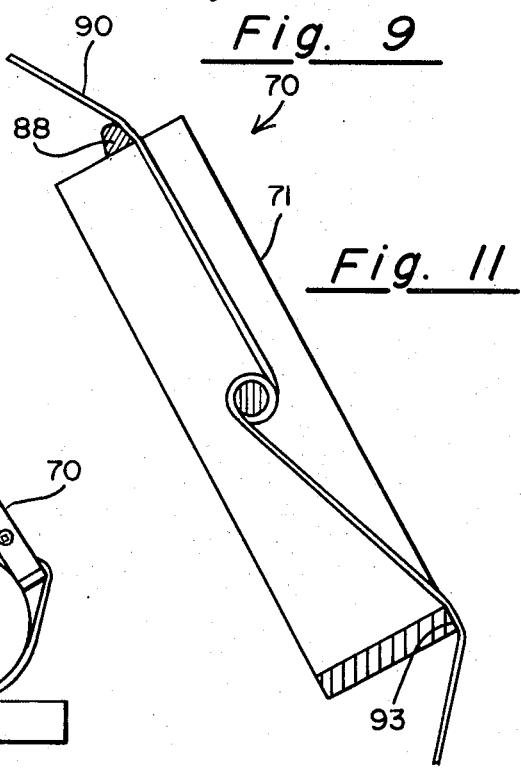
FIG. 11 illustrates the load fastener and strap operable as a load binder.
Figure 12:
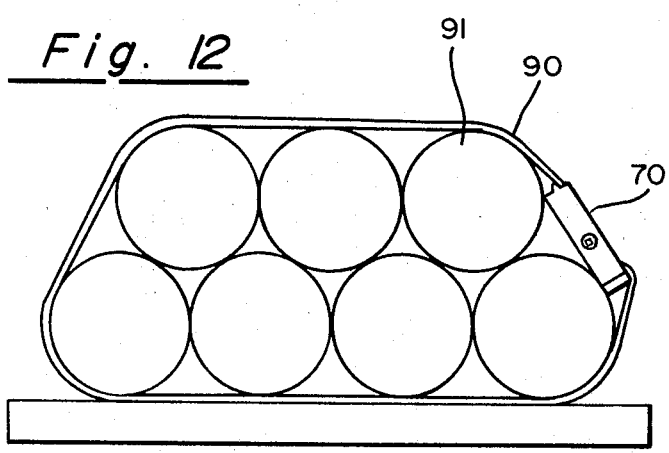
FIG. 12 shows a load fastener and strap of FIG. 11 in an operable position as a load binder on a flatbed carrier.

Referring to FIG. 11, there is shown still another alternate use of load fastener 70. FIG. 11 shows a sectioned housing with a double strap passing through shaft 78. In this particular configuration both ends of strap 90 pass through the center of shaft 78 as shown in FIG. 9, however, instead of mounting fastener 70 to the flatbed carrier, as shown in FIG. 10, strap 90 passes over web supporting surface 88 completely around load 91 and over web supporting surface 93 on the bottom of fastener 70. The significance of the use of the loading mechanism in this manner is that web supporting surfaces on the top and bottom of fastener 70 coact to provide an inward force on fastener 70. Thus, the passing of the strap over the two web supporting surfaces prevents any torquing or twisting of the fastener during tightening. That is, in the absence of web supporting surface 88 or web supporting surface 93, a tightening force would cause the housing to twist or turn in response to the direction of tightening thus possibly causing the unit to flip or gouge the load. However, with this configuration, the tension on strap 90 holds housings 71 and 71a securely against the load. In order to prevent the ratchet mechanism from gouging or damaging the load, ratchet wheel 80 is typically smaller in diameter than the housing so it will not come in contact with the load and thus gouge it during the tightening process.

In order to accommodate various size loads and have sufficient space for winding of web 90, I typically have housing members 71 and 71a from 9 inches to 12 inches long. However, this is given by way of illustration and no limitation in intended thereto. With these sizes I can wind up to 24 feet of 3-inch nylon webbing having 24,000 pound tensile strength.

Referring to FIG. 13, an alternate embodiment of my invention is shown and designated by reference numeral 100. The embodiment of my binder shown in FIG. 13 is usable with a chain as opposed to the other embodiments which are usable with a web or the like. Reference numeral 100 designates the binder which is comprised of a first side member 101, a second side member 102, a chain holding member 103 which is an idler wheel and a sprocket wheel 107 which are located between side member 101 and side member 102. Located at the bottom of binder 100 are a pair of stakes 114 and 115 which are adaptable to fit into the openings of the stake bed of a truck or the like. These stakes can be pinned or bolted to the bed of a truck and are of sufficient length to extend through or almost through the stake bed openings. Located on one side of binder 100 is a dog or pawl 109 which is pivotally mounted on pin 110 to engage a ratchet wheel 113. Ratchet wheel 113 has a recess 118 therein for engagement with a lever for rotating the ratchel wheel. Similarly, located on the other side of binder 100 is a pawl and ratchet wheel (not shown) which provides additional holding strength for the binder.

In operation of binder 100, a chain 106 engages the chainlink sprockets or recesses 108 which are located around the periphery of sprocket wheel 107. Thus, in operation of binder 100, the chain links of chain 106 engage several of the sprockets on sprocket wheel 107. The chain links are held in the chain link sprockets of the sprocket by an idler pulley 103 which has a central groove to match the links that lay edgeways between the two pulleys. The purpose of idler pulley 103 is to firmly hold alternate chain links in the chain sprockets yet still allow the chain to be drawn easily around sprocket wheel 107 when the unit is tightened. The recess in the sprocket wheel is the type commonly used in chain hoists and the like, however, the present invention differs from a chain hoist in that the chain is held in contact with the chain sprocket recess by the idler wheel 103.

When binder 100 is holding a load to a truck bed or the like, the end of chain 106 which projects through guide 116 extends around the load in the same manner as my web binders. However, in the present invention, the top bar or support surface for engagement of the web has been replaced with a chain holding member which is an idler pulley 103. Idler pulley 107 is preferred because it has very little frictional resistance to tightening of the chain. In addition, instead of wrapping the tiedown member around the shaft, this embodiment allows one to use a single piece chain without having to wrap the chain around sprocket 107. The particular advantage of this feature is that any length chain can be used and any excess chain length can be stored in a container or tied down to the load. As the operation of the ratchet and pawls are identical to the other embodiments, they will not be described herein.

It is understood that the term tie down includes such tie downs as ropes, chains, webs, cords, cables, or the like and that with the embodiment of FIG. 13, one can utilize a web or the like as a portion of the tie down with a chain as the remaining portion of the tie down.

While the embodiment shown in FIG. 13 discloses a round sprocket wheel, I can also use a triangular or square shape sprocket wheel which similarly contains sprocket recesses therein for engagement of a chain.

I claim:

1. A heavy duty load fastening device, comprising:
a housing adaptable for detachably mounting on a carrier, said housing including a first side member and a second side member, said first side member spaced from said second side member to provide an opening between said first side member and said second side member for a chain sprocket wheel;
said chain sprocket wheel having a peripheral surface with a plurality of recesses therein for receiving and positively engaging the links of a chain, said chain sprocket wheel rotatably mounted in the space between said first side member and said second side member;
a chain holding member, said chain holding member mounted on said first side member and said second side member, said chain holding member located in the space between said first side member and said second side member, said chain holding member having a peripheral surface for holding said chain links in an edgewise position, said chain holding member spaced sufficiently close to said peripheral surface of said sprocket wheel to hold at least one of said chain links securely in at least one of said plurality of recesses in said chain sprocket wheel;

a ratchet member rigidly connected to said sprocket and rotatably mounted on said housing; and
a pawl mounted on said housing for forming interlocking engagement with said ratchet member to thereby prevent rotation of said ratchet member and said sprocket wheel in at least one direction when said pawl is in interlocking engagement with said ratchet member.

2. The invention of claim 1 wherein said chain holding member being an idler wheel said idler wheel including a groove for allowing links to pass edgewise between said chain sprocket wheel and said idler wheel.

3. A heavy duty load fastening device comprising:
a housing adaptable for detachably mounting on a carrier, said housing including a first and a second member for rotatably supporting a tiedown engaging member therein having a first tiedown supporting surface at one side of said tie down engaging member, said housing further including a base for supporting said first member and said second member, said base constituting said first tie down supporting surface, a second tiedown supporting surface connecting said first member to said second member at the other side of said tiedown engaging member;
said tiedown engaging member including means for rotating said tie down engaging member;
a ratchet member rigidly connected to said tie-down engaging member and rotatably mounted on said housing;
a pawl mounted on said housing for forming interlocking engagement with said ratchet member to thereby prevent rotation of said ratchet member and said tiedown engaging member in at least one direction when said pawl is in interlocking engagement with said ratchet member; and
a tiedown for fastening a load and for engaging said tiedown engaging member, said tiedown engagable with said tiedown supporting surfaces for exerting pressure thereon; said tiedown operable for receiving a tension force by rotation of said tiedown engaging member, said tie down, said tiedown engaging member, and said supporting surfaces coacting so that rotation of said tiedown engaging member causes said tiedown to be placed in tension so that the tension on said tiedown is operable to simultaneously tightly hold a load and maintain said pawl in interlocking engagement with said ratchet member.

4. The invention of claim 3 wherein said tiedown includes a web.

5. The invention of claim 4 wherein said tiedown engaging member includes a detachable handle for applying a torque to said tiedown engaging member.

6. The invention of claim 5 wherein said web has a thickness one-half $a$ and said tiedown engaging member includes an elongated opening therein having an opening for receiving two webs of thickness one-half $a$.

7. The invention of claim 6 wherein said carrier is a flatbed carrier having at least two load fastening devices located thereon.

8. The invention of claim 6 wherein said load fastening device includes nylon web having a tensile strength of at least 24,000 pounds.

* * * * *